United States Patent
Boyer, Jr. et al.

(10) Patent No.: US 6,635,290 B1
(45) Date of Patent: Oct. 21, 2003

(54) SHELF STABLE KIT FOR MAKING CHILI

(75) Inventors: Richard B. Boyer, Jr., Northumberland, PA (US); James L. Bakker, Strongsville, OH (US)

(73) Assignee: Furman Foods, Inc., Northumberland, PA (US)

(*) Notice: Subject to any disclaimer, the term of this patent is extended or adjusted under 35 U.S.C. 154(b) by 0 days.

(21) Appl. No.: 09/270,867

(22) Filed: Mar. 17, 1999

(51) Int. Cl.⁷ .............................................. A23B 7/10
(52) U.S. Cl. ....................... 426/106; 426/324; 426/326; 426/634
(58) Field of Search .................. 426/324, 325, 426/326, 412, 634, 106

(56) References Cited

U.S. PATENT DOCUMENTS

| | | | | |
|---|---|---|---|---|
| 2,434,388 A | * | 1/1948 | Brenm | 426/325 |
| 2,594,213 A | * | 4/1952 | Ranx | 426/325 |
| 2,616,810 A | * | 11/1952 | Gallenkamp | 426/325 |
| 3,397,999 A | * | 8/1968 | Kellerman | 426/324 |
| 3,454,406 A | * | 7/1969 | Alderton | 426/325 |
| 3,539,359 A | * | 11/1970 | Murchison et al. | 426/324 |
| 3,886,296 A | * | 5/1975 | Brooks et al. | 426/325 |
| 4,054,674 A | * | 10/1977 | Barker et al. | 426/326 |
| 4,262,027 A | * | 4/1981 | Tonner et al. | 426/325 |
| 4,539,212 A | * | 9/1985 | Hunter | 426/326 |
| 4,597,976 A | * | 7/1986 | Doster et al. | 426/325 |
| 4,612,203 A | * | 9/1986 | Wong et al. | 426/589 |
| 4,659,576 A | * | 4/1987 | Dahle et al. | 426/324 |
| 4,741,911 A | * | 5/1988 | McIntyre et al. | 426/324 |
| 4,789,553 A | * | 12/1988 | McIntyre et al. | 426/324 |
| 4,900,578 A | | 2/1990 | Bakker et al. | 426/634 |
| 5,057,330 A | * | 10/1991 | Lee et al. | 426/324 |
| 5,332,587 A | * | 7/1994 | Howard et al. | 426/324 |
| 5,562,938 A | * | 10/1996 | Lee et al. | 426/324 |

FOREIGN PATENT DOCUMENTS

| | | | | |
|---|---|---|---|---|
| CA | 1071920 | * | 2/1980 | 426/326 |
| CA | 1131982 | * | 9/1982 | 426/325 |
| EP | 192354 | * | 8/1986 | 426/324 |
| GB | 2036533 | * | 7/1980 | 426/325 |
| GB | 2061693 | * | 5/1981 | 426/324 |
| GB | 2174588 | * | 11/1986 | 426/324 |
| WO | WO92/03934 | * | 3/1992 | 426/324 |
| WO | WO92/08361 | * | 5/1992 | 426/325 |
| WO | WO93/19609 | * | 10/1993 | 426/324 |

* cited by examiner

*Primary Examiner*—Steve Weinstein
(74) *Attorney, Agent, or Firm*—Pearne & Gordon LLP

(57) ABSTRACT

A process for preserving foodstuff by acidifying it with a phosphoric acid water solution. The foodstuff is immersed in the phosphoric acid solution with appropriate time pressure and temperature conditions to result in a state of equilibrium in which a pH of 4.6 or less is achieved. Any unwanted tart aftertaste is masked with a sweetening agent added to the acid solution. The process is used to produce a chili mix including rehydrated beans, vegetables, and spices, all of which are packaged in a shelf stable pouch particularly suited for the restaurant trade.

1 Claim, 1 Drawing Sheet

SHELF STABLE KIT FOR MAKING CHILI

The invention relates to food products and their preservation and, in particular, to foodstuff preserved by an acidification process.

PRIOR ART

Food products are commonly preserved by canning processes or by freezing processes. Canning is relatively expensive due to packaging costs and inefficient space utilization. Often, the heating treatment in the canning process is detrimental to the color and body of the food solids being canned. Cans are troublesome to open and are environmentally unsatisfactory. Freezing can be relatively expensive when shipping and storage costs are considered. Frozen food products, moreover, can require additional time for heating when finally being prepared for consumption.

It is known that food products can be rendered shelf-stable against botulism and bacteria growth if they are stored in an acidic condition with a pH of 4.6 or less. A problem regularly encountered in foodstuff existing in an acid state strong enough to be shelf-stable is a sour or tart taste that may not be considered palatable for most food products.

Commercial food preparation at the point of consumption poses concerns, for example, in terms of quality, consistency and cost. This is particularly true at fast-food retail establishments where food is prepared daily and where the labor force is largely unskilled and varies from day to day and shift to shift. Consistency under these circumstances is difficult to maintain particularly where preparation involves numerous steps.

SUMMARY OF THE INVENTION

The invention provides a method of preserving foodstuff with sufficient acidity to make it shelf-stable, but which leaves it surprisingly low in sourness or tartness. The method utilizes phosphoric acid to achieve the required acidity. It has been found that the inherent sour or tart taste of the phosphoric acid is limited and, if desired, can be readily masked with appropriate addition of a sweetener such as sugar.

The invention provides a way of preserving foods, such as vegetables or vegetable-based foods, which can utilize a plastic pouch or other inexpensive package and that avoids the need for detrimental heat treatment, such as in canning, to prevent spoilage.

The invention is particularly suited for use with dry beans that can be simultaneously rehydrated and acidified for preservation. An example of a large market for such rehydrated beans is the restaurant trade for making chili.

In accordance with the invention, the rehydrated and acidified beans can be combined with other acidified constituents of a specified chili mix. The acidified chili mix can be economically packaged in a conventional heat-sealed pouch. The ability to combine all of the constituents of a chili mix, except for meat and/or water, has numerous advantages to a restaurant operator. The restaurant or restaurant chain can deal with a single supplier to more easily control quality and cost. Mistakes in making up a batch of chili from several separate constituent packages at the restaurant is eliminated.

The disclosed preservation process produces a rehydrated bean that typically has more firmness or body and better color than that ordinarily obtained from like beans which are subjected to conventional canning preservation techniques.

If desired, a natural or artificial beef tallow can be introduced during the bean treating process of the invention to provide a tasty bean in the final product, with less overall cooking time than would be required to obtain the same taste by conventional cooking methods.

Compared to traditional procedures where cans of beans are used in a chili recipe, the present invention, besides offering more full bodied beans, reduces packaging costs by substituting an inexpensive plastic pouch for a more expensive can. Moreover, a pouch offers less weight to ship, denser packaging since the voids between cans are avoided, no risk of a finger being cut on a raw can edge and less disposal problems including environmental concerns, compared to a can. Compared to frozen packages of beans, the pouch of the present invention is cheaper to store and ship since there is no concern of maintaining the package below freezing temperatures. Additionally, the room temperature of the pouch kit of the invention reduces cooking time when compared to the use of frozen packages.

The disclosed preservation treatment of the chili components prior to pouching is compatible with essentially all of the typical components of a chili mix apart from any beef or other meat content. In fact, the invention can be used to produce a vegetarian chili kit that is served essentially as it is packaged in a pouch with no meat content. There is no degradation of flavor or consistency during shelf storage of the pouch when prepared in the disclosed manner.

DESCRIPTION OF THE PREFERRED EMBODIMENT

Figure 1:
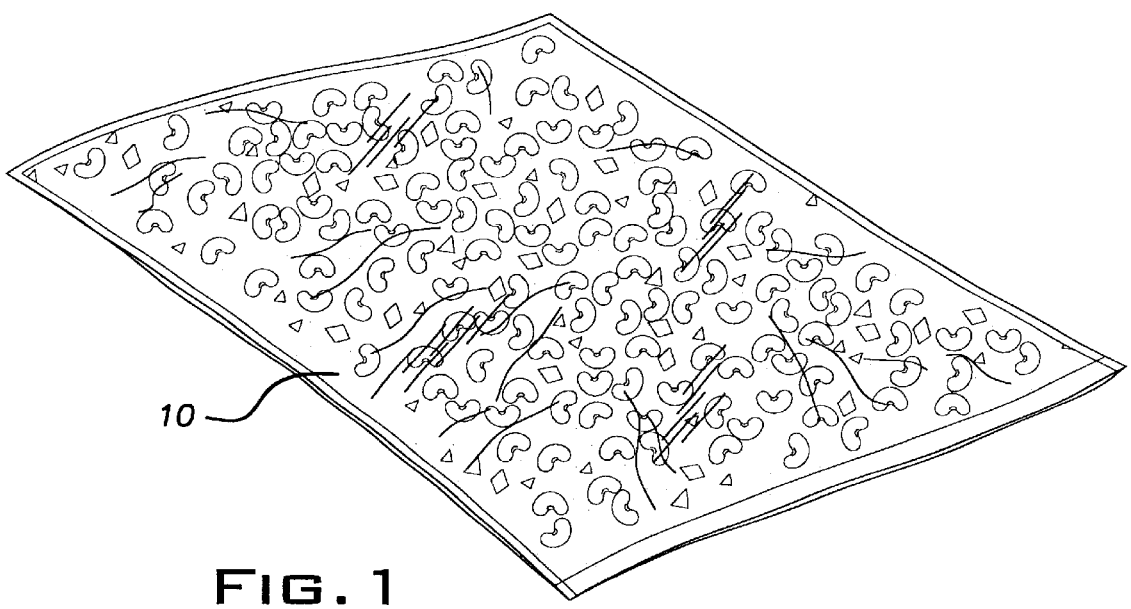
FIG. 1 is a schematic view of a pouch filled with a chili mix kit.

The invention can be used to produce a chili mix kit for commercial distribution in the following manner. The following ingredients are placed into a suitable tank of stainless steel. The ingredients are preferably introduced to the tank in the listed sequence:

86% water (at 160° F.)

0.79% phosphoric acid (H3PO4 at 85% concentration)

1.8% dry sugar 11.6% dry beans (a single variety or in a blend of two or more varieties)

The phosphoric acid and sugar are added to the water in constant slow agitation to form a soaking solution. Thereafter, the beans are added without agitation and are allowed to soak for about four hours.

The soaked beans are removed and transferred to a pressure cooking vessel such as manufactured by Paul Kuntz Corporation. To the pressure vessel, a solution of the following ingredients is added to make up a batch:

55 gallons of the soak water described above 425 lbs. of the soaked beans 10 lbs. dry sugar 3 lbs. seasoning 0.56 lbs. CAC12

0.035 lb. EDTA

The seasoning, typically contains, in proportions suitable to achieve a desired taste, chili powder, black pepper, cumin, red pepper, paprika, and garlic powder. The pressure vessel containing the above mix is closed and heated to 20 psig through 11 revolutions, lasting about 14 minutes of cycling. Thereafter, the vessel is drained and the treated beans are conveyed to a hot fill batching area. At the batching area, desired quantities of dried tomatoes, vegetables, such as onions, celery and green peppers, additional sugar, (additional acid and tomato paste are added to the beans. This mix, heated to 200° F. or above, is discharged through a conventional filler into individual pouches 10 shown schematically in FIG. 1. When properly filled, each pouch 10 is heat sealed in a known manner. The pouches 10, which are formed of suitable thermoplastic sheet material such as protective packaging film such as a composite coextruded film of biaxially oriented nylon, linear low density polyethylene and polyethylene vinyl alcohol. A suitable product is marketed under the registered trade name Liquiflex, Grade 8146-M. The contents 11 of the pouch 10 represent a kit for making chili that can be simply combined with appropriate amounts of beef or other meat and water to make a restaurant size batch of chili. When the pouches are destined for a high volume fast-food restaurant, they can contain sufficient beans and vegetables to make 40 or 50 servings, for example. With the pouch contents being at room temperature and avoiding the need for frozen components, they can be heated to a simmering temperature in a relatively short time thereby significantly reducing preparation time. If desired, natural or artificial beef tallow can be introduced with the ingredients that are put in the pressure vessel to give the treated beans a meat flavor. Preliminary meat flavoring of the beans can reduce the amount of time that is required to simmer or cook the chili before serving.

The use of phosphoric acid in the disclosed process has been found to leave the treated foodstuff relatively free of sour or tart aftertaste. Any objectionable sour or tart taste from the phosphoric acid can be masked by relatively low amounts of sugar. While the disclosed preferred embodiment of the invention involves the treatment of beans and other vegetables, it is contemplated that other foodstuff can be acidified for preservation with phosphoric acid with an appropriate combination of acid strength, pressure, temperature and time to reach an equilibrium pH throughout the body of the foodstuff at 4.6 or lower.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A room temperature, shelf stable kit for making chili comprising a sealed plastic pouch containing an acidified chili mix comprising acidified, rehydrated beans, acidified by exposure to a phosphoric acid containing water solution, acidified vegetables, spices, and an acidified water solution containing phosphoric acid wherein the phosphoric acid is present in a quantity sufficient to a maintain the solution at a pH of 4.6 or less, the shelf stable kit being made by the method comprising soaking dried beans in a heated water solution of phosphoric acid and then subjecting said soaked beans in said water solution of phosphoric acid to heat and pressure above atmospheric pressure in a pressure cooker, said soaking and subjecting steps being for a time, temperature, pressure and pH of said solution sufficient to allow the beans to reach an equilibrium pH throughout the body of the beans of 4.6 or lower to produce said acidified, rehydrated beans and then hot filling into said pouch said acidified beans, acidified vegetables, and spices and an acidified water solution containing phosphoric acid which has sufficient phosphoric acid to maintain the solution at a pH of 4.6 or less, said beans, vegetables, and spices, being present in the pouch in an amount sufficient to make chili when combined with meat and water.

\* \* \* \* \*